United States Patent
Lanning

(10) Patent No.: US 10,030,784 B2
(45) Date of Patent: Jul. 24, 2018

(54) BALL VALVE TERTIARY SEAL ASSEMBLY AND METHOD

(71) Applicant: WORLDWIDE OILFIELD MACHINE, INC., Houston, TX (US)

(72) Inventor: William W Lanning, Montgomery, TX (US)

(73) Assignee: Worldwide Oilfield Machine, Inc., Houston, TX (US)

( * ) Notice: Subject to any disclaimer, the term of this patent is extended or adjusted under 35 U.S.C. 154(b) by 331 days.

(21) Appl. No.: 14/740,625

(22) Filed: Jun. 16, 2015

(65) Prior Publication Data

US 2016/0369901 A1 Dec. 22, 2016

(51) Int. Cl.
| | |
|---|---|
| *F16K 27/06* | (2006.01) |
| *F16K 5/20* | (2006.01) |
| *F02M 61/16* | (2006.01) |
| *F16K 5/06* | (2006.01) |

(52) U.S. Cl.
CPC .......... *F16K 27/067* (2013.01); *F16K 5/0689* (2013.01); *F16K 5/205* (2013.01); *F02M 61/168* (2013.01); *F16K 5/06* (2013.01)

(58) Field of Classification Search
CPC .......... F16K 5/0689; F16K 5/06; F16K 5/205; F16K 27/067; F02M 61/168
See application file for complete search history.

(56) References Cited

U.S. PATENT DOCUMENTS

| | | | | |
|---|---|---|---|---|
| 2,810,543 A | * | 10/1957 | Bryant | F16K 3/316 251/172 |
| 3,339,886 A | | 9/1967 | Grove | |
| 3,504,885 A | | 4/1970 | Hulsey | |
| 3,565,392 A | * | 2/1971 | Bryant | F16K 5/205 251/159 |
| 3,912,220 A | * | 10/1975 | Vasicek | F16K 5/205 251/159 |
| 3,990,465 A | * | 11/1976 | Allen | F16K 5/227 137/246.22 |
| 4,083,376 A | * | 4/1978 | Alaniz | F16K 5/0673 137/246.22 |

(Continued)

OTHER PUBLICATIONS

International Search Report, PCT/US16/037162, dated Oct. 6, 2016.

(Continued)

*Primary Examiner* — Matthew W Jellett
*Assistant Examiner* — Christopher Ballman
(74) *Attorney, Agent, or Firm* — Kenneth L. Nath; Thomas D. Nash

(57) ABSTRACT

A high pressure ball valve seal assembly utilizes primary, secondary, and tertiary seals to withstand debris, caustic fluids, high pressure, and high temperature. The seal assembly comprises first and second inner seats and first and second outer seats which are retained within the valve body. First inner and outer seats are mounted on a first side of a closure member in the valve cavity and second inner and outer seats mounted on a second side of the closure member opposite the first side. A plurality of sealing rings are provided, whereby the sealing rings may be arranged to provide a tertiary upstream seal physically located on the downstream side of the ball valve.

13 Claims, 3 Drawing Sheets

(56) References Cited

U.S. PATENT DOCUMENTS

| | | | |
|---|---|---|---|
| 4,137,936 A * | 2/1979 | Sekimoto | F16K 5/0673 |
| | | | 137/246.22 |
| 4,280,522 A | 7/1981 | Pechnyo et al. | |
| 5,090,661 A | 2/1992 | Parks, Jr. et al. | |
| 5,320,327 A | 6/1994 | Beson | |
| 5,322,261 A | 6/1994 | Aarnes | |
| 5,338,003 A | 8/1994 | Beson | |
| 5,533,738 A * | 7/1996 | Hoffmann | F16K 5/205 |
| | | | 251/172 |
| 5,494,256 A | 8/1996 | Beson | |
| 5,624,101 A * | 4/1997 | Beson | F16K 3/20 |
| | | | 251/172 |
| 6,082,707 A * | 7/2000 | Hosie | F16K 5/0678 |
| | | | 251/172 |
| 6,669,171 B1 * | 12/2003 | Stunkard | F16K 5/0673 |
| | | | 251/315.08 |
| 7,032,880 B2 * | 4/2006 | Scaramucci | F16K 5/0678 |
| | | | 251/172 |
| 8,646,752 B2 * | 2/2014 | Beasley | F16K 5/0678 |
| | | | 251/170 |
| 8,985,136 B2 * | 3/2015 | Avdjian | F16K 5/0605 |
| | | | 137/315.18 |
| 2008/0179558 A1 * | 7/2008 | Lloyd | F16K 5/0689 |
| | | | 251/180 |
| 2015/0377366 A1 * | 12/2015 | Hartman | F16K 5/205 |
| | | | 251/180 |

OTHER PUBLICATIONS

Worldwide Oilfield Machine, Inc., Dual Seal Ball Valve Model 30, Jan. 2011, pp. 1-20.

* cited by examiner

BALL VALVE TERTIARY SEAL ASSEMBLY AND METHOD

BACKGROUND OF THE INVENTION

Field of the Invention

The present invention relates generally to ball valve seal assemblies and, more particularly, to a ball valve tertiary seal assembly.

Description of the Prior Art

Ball valves have been used for years and have employed closure members of a generally spherical shape. These members are rotated about one of its axes to align or place out of line the through-port with the flow passages of the body member to establish the open and closed positions of the stopper. The provision of the closure member in spherical form has a number inherent advantages, not the least of which is overall compactness of the valve and that it requires only one quarter turn of the closure member or spherical stopper to move from open to close and from close to open, as distinguished from the gate type valve where the stopper member must be shifted axially to and from closed position. As distinguished from the tapered or conical type of stopper, all difficulties of the "wedging" effect are avoided.

Ball valves generally provide for a single seal between the ball and the seat on both sides of the ball to provide. The problem of maintaining an effective seal in high pressure ball valves has long been recognized. Prior efforts to solve the problem of maintaining a satisfactory seal in ball valves are shown in Hulsey U.S. Pat. No. 3,504,885 and Grove U.S. Pat. No. 3,339,886 referenced above.

Independently operable dual seals have also been provided to address this problem. Exemplary U.S. Pat. Nos. 5,338,003, 5,320,327 and 54,942 to John Beson disclose high pressure ball valves having dual, independent seat to ball seals, the dual seal arrangement including a primary seal and a secondary seal, each operating independently, in proper sequence, each acting in the same direction, and each being pressure actuated, with provision for relieving excess fluid pressure.

Further, an independent tertiary ball valve seal has been utilized in the past but this prior art design requires that the upstream and downstream seal assemblies are different in shape. In this prior art tertiary seal design, the ball valve can be changed from a ball valve with identical primary and secondary seals on both sides of the closure member to a ball valve with primary and secondary seals on one side of the closure member with a tertiary seal on the opposite side of the ball valve. This design would still have one seal to close off flow in the opposite direction. Changing between the two modes of operation is made more difficult due to the requirement of different seal assemblies when the tertiary or third seal is desired.

It is an objective of the present invention to provide a long-lived multiple seal valve which can be operated with dual seals in either direction or can be changed to provide a tertiary seal without a requirement for different seats on opposite sides of the ball making the ball valve considerably less expensive to manufacture and less complicated to change.

Consequently, those of skill in the art will appreciate the present invention, which addresses the above problems and other significant problems uncovered by the inventor that are discussed hereinafter.

SUMMARY OF THE INVENTION

It is a general purpose of the present invention to provide an improved seal assembly and method.

An object of the present invention is to provide an improved upstream sealing assembly and method that may be utilized in ball valve pressure control equipment.

Another object of the present invention is to provide a multiple seal assembly providing for primary, secondary, and tertiary seals.

A further object of the present invention is to provide a ball valve seal assembly with an extended service life as compared with conventional ball valves.

Accordingly, the present invention provides a ball valve may comprise a valve body and a closure member mounted in the valve body. The closure member is round and rotatable between an open and a closed position to open and close a flowpath through the valve body.

A plurality of seats for the ball valve are provided with a plurality of seal ring grooves.

The ball valve is selectively configurable in a first configuration or a second configuration.

The first configuration comprises a first group of sealing rings mounted in selected of the plurality of seal ring grooves to form bi-directional primary seals and bi-directional secondary seals, wherein a respective secondary seal is activated upon leakage of a respective primary seal.

The second configuration comprises a second group of sealing rings mounted in selected of the plurality of seal ring grooves to form bi-directional primary seals, a secondary seal and a tertiary seal, wherein the tertiary seal is activated upon leakage of the secondary seal. In one embodiment, only two sealing rings are changed between the first configuration and the second configuration.

The plurality of seats may comprise a first inner seat mounted in the valve body that engages a first side of the closure member, a second inner seat mounted in the valve body that engages a second side of the closure member, a first outer seat mounted in the valve body that engages a first side of the closure member, and a second outer seat mounted in the valve body that engages a second side of the closure member.

In one preferred embodiment, the first inner seat is axially moveable with respect to an axis of the flowpath, the second inner seat is axially moveable with respect to an axis of the flowpath, the first outer seat is axially moveable with respect to an axis of the flowpath, and the second outer seat is axially moveable with respect to an axis of the flowpath.

The plurality of seal ring grooves are disposed in the first inner seat, the second inner seat, the first outer seat, and the second outer seat.

The valve may further comprise a peripheral seal ring groove formed on an outer periphery of at least one of the first inner seat or the second inner seat so that presence of at least one seal ring within the peripheral seal ring is consistent with the second configuration.

The valve may further comprise a peripheral seal ring groove formed on an outer periphery of at least one of the first outer seat or the second outer seat so that absence of at least one seal ring within the peripheral seal ring is consistent with the second configuration.

In one embodiment, a plurality of seal rings are mountable in selectable of the seal ring grooves. In a first selective configuration of the plurality of seal rings, the first inner seat and the second inner seat are each operable to form a primary seal with the closure member, the first outer seat and the second outer seat are each operable to form a secondary seal with the closure member.

In a second selective configuration of the plurality of seal rings, the first inner seat and the second inner seat are each operable to form a primary seal with the closure member.

The first outer seat is operable to form a secondary seal and the second outer seat is operable to form a tertiary seal that is energized by upstream pressure when leakage occurs in the primary seal of the first inner seat and the secondary seal of the first outer seat.

The valve may further comprise a peripheral seal ring groove formed on an outer periphery of at least one of the first inner seat or the second inner seat so that absence of at least one seal ring within the peripheral seal ring groove is consistent with the first selective configuration of the plurality of seal rings.

The valve may further comprise a peripheral seal ring groove formed on an outer periphery of at least one of the first outer seat or the second outer seat so that presence of at least one seal ring within the peripheral seal ring groove is consistent with the first In one embodiment, a method for making a ball valve may comprise providing a valve body and providing a closure member mounted in the valve body.

Other steps may comprise providing a plurality of seats, and providing that a first configuration of sealing rings mounted on the plurality of seats form bi-directional primary seals and bi-directional secondary seals, wherein a respective secondary seal is activated upon leakage of a respective primary seal.

Another step may comprise providing that a second configuration of sealing rings mounted on the plurality of seats form bi-directional primary seals, a secondary seal and a tertiary seal, wherein the tertiary seal is activated upon leakage of the secondary seal.

BRIEF DESCRIPTION OF DRAWINGS

For a further understanding of the nature and objects of the present invention, reference should be had to the following detailed description, taken in conjunction with the accompanying drawings, in which like elements may be given the same or analogous reference numbers and wherein.

While the present invention will be described in connection with presently preferred embodiments, it will be understood that it is not intended to limit the invention to those embodiments. On the contrary, it is intended to cover all alternatives, modifications, and equivalents included within the spirit of the invention.

DETAILED DESCRIPTION OF THE PREFERRED EMBODIMENTS

Figure 1:
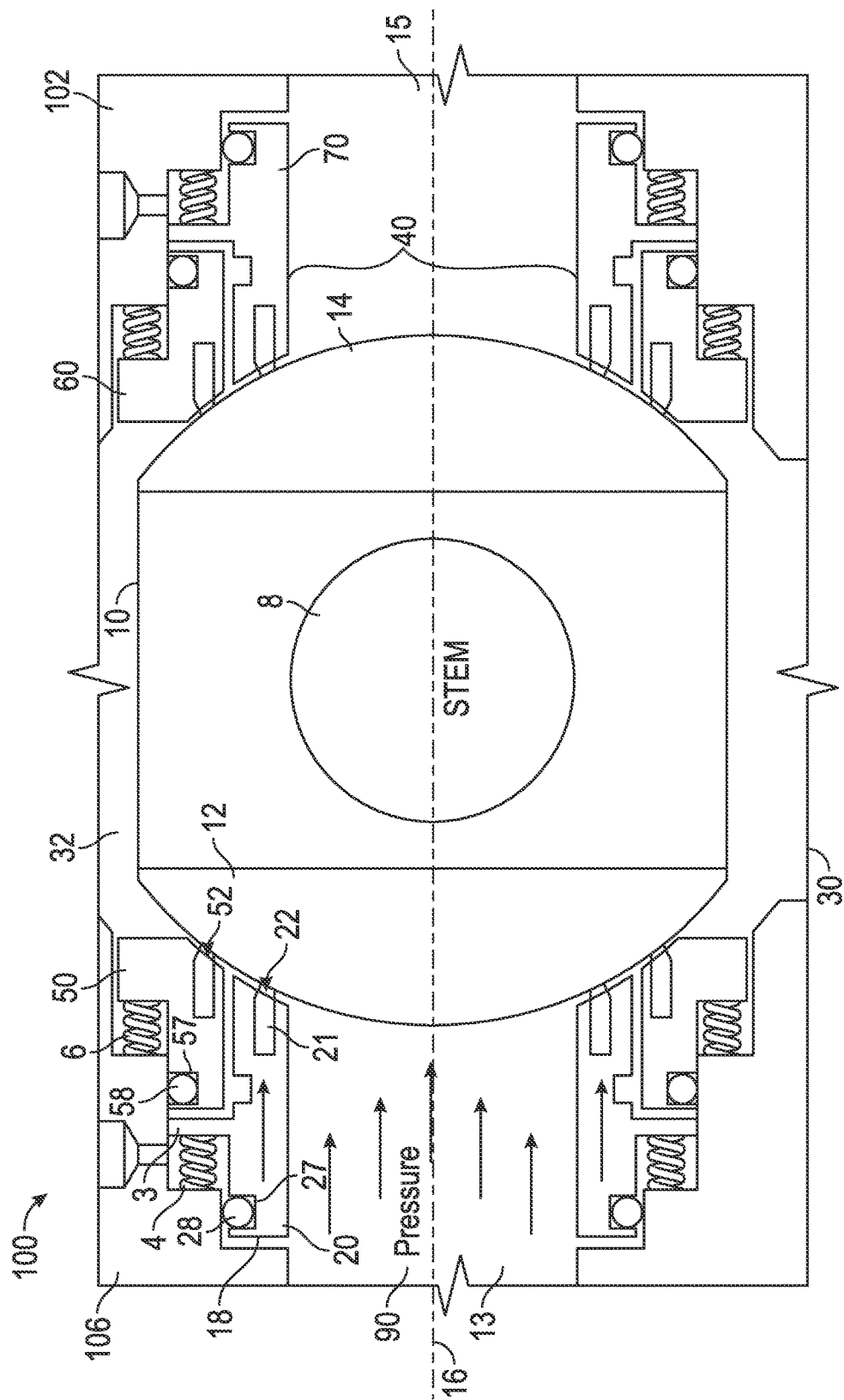
FIG. 1 is a top conceptual view, partially in cross-section, of a ball valve with a primary seal engaged in accord with one possible embodiment of the present invention.

Referring now to the drawings and more particularly to FIG. 1, there is shown a view of ball valve 100 in the closed position. In one embodiment, ball valve 100 can be a trunnion mounted ball valve arrangement and may or may not comprise an explosion proof valve. However, the teachings provided for herein may apply to other ball valve arrangements.

Spherical or ball closure member 10 is mounted within valve cavity or chamber 32 defined by valve body 30. First inner seat 20 and first outer seat 50 are mounted on a first side of closure member 10. Second inner seat 70 and second outer seat 60 are mounted on a second side of closure member 10 opposing the first side of closure member 10. Stem 8 rotates closure member 10 a quarter turn between an open position and a closed position with respect to bore 40.

Upstream stepped interior 106 defines a stepped interior surface of cavity 32 within valve body 30. Stepped interior 106 supports first inner seat 20 and first outer seat 50 in position with respect to each other and closure member 10. Downstream stepped interior 102 also supports second inner seat 70 and second outer seat 60 against closure member 10 within valve chamber 32. Upstream interior 106 and downstream interior 102 are preferably mirror images of each other.

Figure 2:
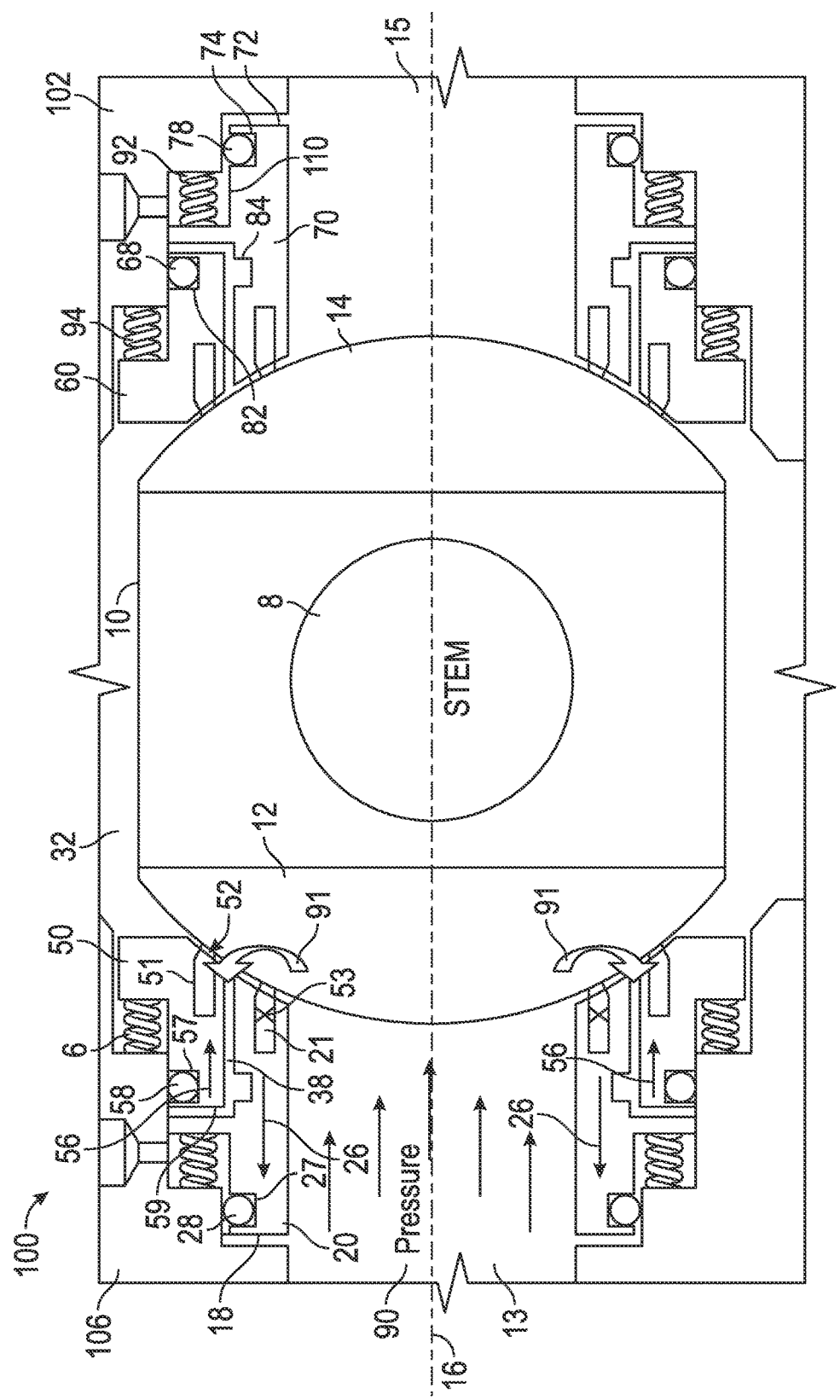
FIG. 2 is a top conceptual view, partially in cross-section, of a ball valve with a secondary seal engaged in accord with one possible embodiment of the present invention.

In FIGS. 1 & 2, the arrangement of first inner seat 20 and first outer seat 50 with respect to each other and valve body 30 can be a mirror image of second outer seat 60 and second inner seat 70 with respect to each other and valve body 30. Various fastening arrangements may be utilized consistent with the teachings herein to secure the inner and outer seats within valve cavity 32. In one embodiment, the upstream and downstream seats can be but do not necessarily have to be interchangeable and can be but do not necessarily have to be mirror images of each other.

First inner seat 20 and first outer seat 50 move axially parallel to bore axis 16 independently of each other. Movement is made with respect to valve element 10 and body 32 within upstream flow path 13. Similarly, both second inner seat 70 and second outer seat 60 are independently axially movable within downstream flowpath 15. Therefore, with the embodiment of FIG. 1, ball valve assembly 100 can provide for both selective upstream and/or downstream sealing to provide bi-directional sealing consistent with the teachings provided herein. This redundant sealing technology whereby the outer seats provide redundant backup sealing enables ball valve 100 to offer a longer service life.

In general operation, ball valve sealing assembly 100 provides for primary seal 22 as upstream pressure 90 pushes against first inner seat end 18 forcing first inner seat sealing face 21 against first sealing side 12 of closure member 10 when closure member 10 is in the closed position. It will be noted that seal element 22 or other seal elements may be of many different types including but not limited to metal to metal seals, corrosive resistant alloy welded inlay, various shaped seals, elastomeric seals, and/or other sealing materials.

In this embodiment, first sealing O-ring 28 is mounted within groove 27 and makes sealing contact with stepped interior 106 as pressure pushes against first inner seat 20. Spring or springs 4 act against first inner seat shoulder 3 to bias first inner sealing face 21 into contact with closure member 10 to provide an initial seal. Increased upstream pressure increases the sealing force at sealing face 21. Therefore, upstream fluid and the upstream fluid pressure 90 is contained to flow passage 13. As pressure decreases, the sealing force decreases. Thus, wear may be decreased as compared to valves that do not provide this option.

Turning now to FIG. 2, in this embodiment, if primary seal 22 is damaged as indicated by X 53 will first outer seat 50 become energized by the pressure indicated by arrows 91 and engage closure member 10 to form a secondary seal. When primary seal 22 is damaged, upstream pressure 90 flows past seal 22 as indicated by arrows 91 through flow passage 38. The pressure that bleeds between first inner seat 20 and first sealing side 12 pushes first inner seat 20 axially backwards as indicated by arrow 26. The fluid travels through channel 38 between first inner seat 20 and first outer seat 50. The pressure behind first outer seat end 59 urges first outer seal element 51 against first sealing side 12 in the direction of arrow 56 to create secondary seal 52. As the upstream pressure increases, the seal force at 52 increases. Likewise, as the force decreases, then less force is applied. In this way, wear at 52 is decreased when less sealing force is required.

Secondary seal 52 uses a new seat and a new area of first sealing side 12 to seal against producing another positive upstream seal for ball valve 100. This action prolongs the effective seal of ball valve 100. Although primary seal 22 is damaged, first inner seat 20 and first inner sealing face 22 now acts as a wiper ring to keep line debris away from secondary seal 52 and further reduces the chances of subsequent seal failure. First outer sealing ring 58 is provided within outer groove 57 so that all the upstream pressure remains in channel 38 to act on the surface of first outer seat end 59 to pressure activate seal 52 and prevents leakage past outer seat 50 into valve cavity 32.

In FIGS. 1 & 2, the arrangement of first inner seat 20 and first outer seat 50 with respect to each other and valve body 30 is a mirror image of second outer seat 60 and second inner seat 70 with respect to each other and valve body 30 as discussed hereinbefore. The valve is bi-directional because the primary and secondary seats on both sides of closure element 10 are substantially the same and operate in the same way.

Figure 3:
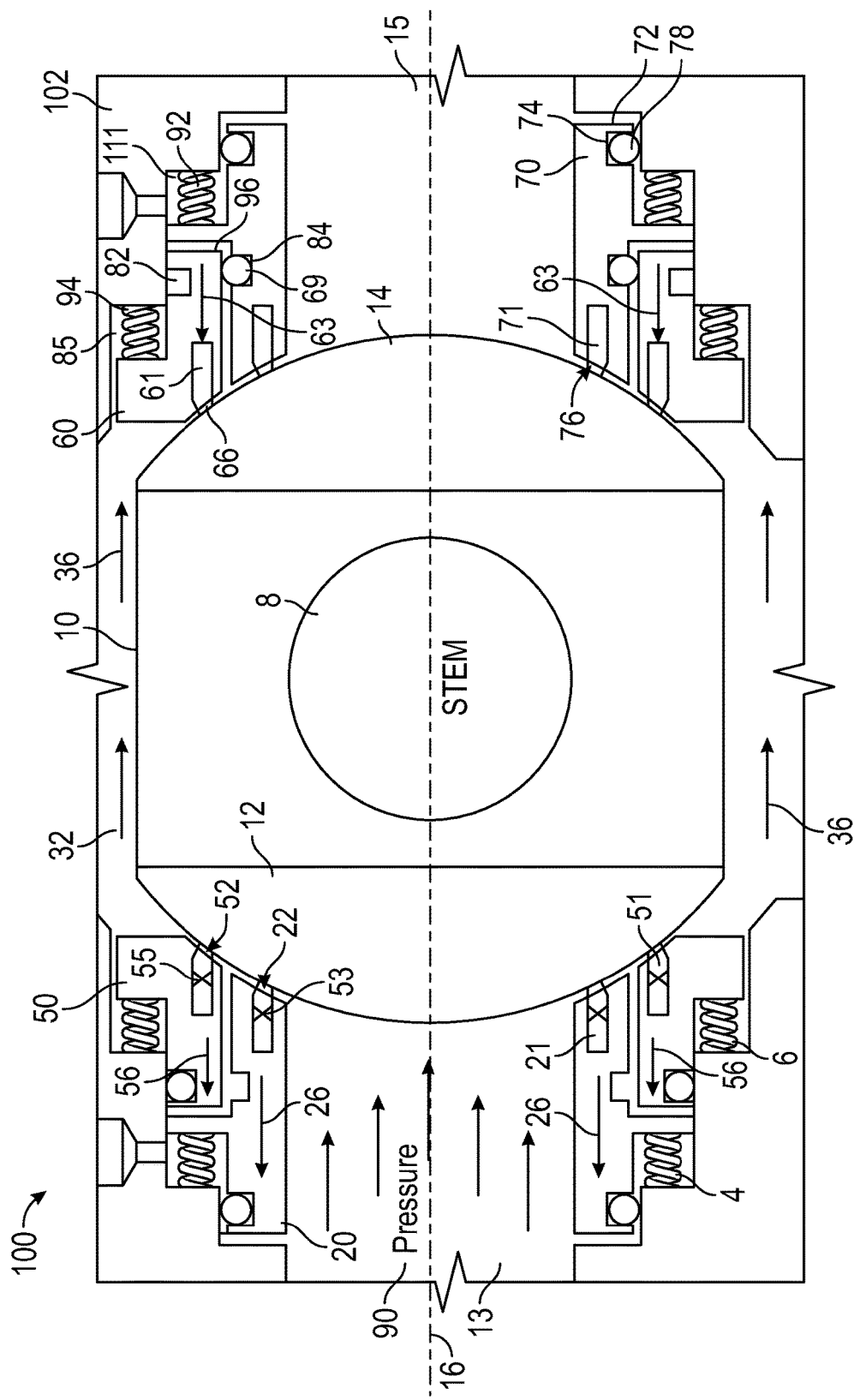
FIG. 3 is a top conceptual view, partially in cross-section, of a ball valve with a tertiary seal engaged in accord with one possible embodiment of the present invention.

However, in the configuration of FIG. 3, when the tertiary sealing mechanism is utilized, three of the four seats operate to seal in one direction and only a primary seal would operate in the opposite way. Accordingly, the valve is still bi-directional but has a preferred direction so that the preferred orientation allows use of all three sets of seals on the upstream side.

Turning now to FIG. 3, ball valve 100 is shown with tertiary upstream seal 66 engaged and pressure activated in accord with one possible embodiment of the present invention. In this case, leakage occurs past seal 22 and 52 as indicated by the crosses 55 and 57. Accordingly, pressure as indicated by arrows 36 flows into cavity 32. Assuming the pressure in cavity 32 is greater than the downstream pressure, then tertiary seal 66 is activated.

Tertiary seal 66 which provides the third back up seal for upstream pressure is created by modifying the arrangement of the downstream sealing members. Second inner seat 70 and second outer seat 60 are duplicates of those shown in FIGS. 1 and 2 and may be duplicates of the corresponding upstream seats. However, sealing ring 68 is removed from second outer seat groove 82. Seal ring 69 is placed within second inner seat groove 84 on the downstream side of ball valve 100. Second inner seat groove 84 is formed on a periphery of the second inner seat and may be referred to as a peripheral seal ring groove herein. A corresponding inner seat groove may be formed on a periphery of the first inner seat. After the sealing rings are mounted as indicated in FIG. 3, second outer seat 60 then acts as a third or tertiary seal backup to operation of first inner and outer seats 20 and 50.

In one embodiment, third sealing ring 69, as well as sealing rings 28, 58, and 78 are comprised of an elastomeric material or other suitable O-ring material. The material for the O-rings and/or other types of sealing members can be selected based on the pressure, temperature, and expected fluids. However, other types of sealing elements could be utilized in place of O-rings.

Sealing ring 69 is positioned around second inner seat 70 in groove 84. Upstream pressure 90 being greater than the downstream pressure in flowpath 15 activates second outer seat 60 and maintains the integrity of second outer seat seal 66 as discussed herein. Assuming leakage past first inner and outer seats 20 and 50, then first inner seat 20 and first outer seat 50 will be urged away from closure member 10 as shown by arrows 26 and 56. Pressure will flow past first inner seat 20 and first outer seat 50 into surrounding closure inner seat in cavity 32 as depicted by arrows 36 before bleeding through channel 85, past empty groove 82, whereby the pressure created will push against second outer end 96 to activate tertiary seal 66 with second outer sealing element 61 and second sealing side 14. Seal ring 69 prevents leakage to the downstream side of the valve and maintains the upstream pressure at end 96 of second outer seat 60 so that second outer seat 60 is urged in the direction of arrow 63.

Springs 94 bias second outer seat 60 into contact with second sealing side 14 to provide an initial seal and/or additional sealing force. Tertiary seal 66 also assures that any overpressure from thermal expansion will always vent back upstream rather than downstream as with conventional ball valve arrangements. Upstream pressure urges third sealing ring 68 to engage second inner seat 60 in the direction of arrow 63 to prevent the pressure from bleeding out downstream. As upstream pressure is increased, then second outer seat 60 is pushed with greater force against closure member 10.

If upstream pressure is reversed, valve 100 is bi-directional. In this embodiment with ball valve 100 being configured for use with tertiary seal 66, second inner seat 70 will form a primary seal 76 if downstream pressure is exerted through flowpath 15 forcing second inner sealing element 71 against second sealing face 14. The pressure would work at surface 72 to urge second inner element 70 towards closure element 10 in the direction of arrow 63. Springs 92 operate to at least form a first seal. In other words, operation of second inner seal to provide a primary seal is the same as discussed with respect to first inner seal forming a primary seal.

While the operation of the third or tertiary seal has been described with the valve remaining closed, the operation due to opening and closing the valve is also a possibility. Essentially, the tertiary seal is activated if the pressure in valve cavity 32 is greater than the pressure in downstream flowpath 15. Each time valve 100 is opened, the valve cavity is exposed to pressure in the upstream and/or downstream flow lines. Accordingly, if pressure in the valve cavity is the upstream high pressure, and after the valve closes then the downstream pressure decreases, tertiary seal 66 is activated. Accordingly, both the primary seal and the tertiary seal may be simultaneously operational. While the primary seal upstream is normally exposed to more debris and so forth, it is possible that the tertiary seal could fail prior to failure of the primary seal. Accordingly, the term tertiary seal as used herein refers to a third seal or third level of sealing rather than necessarily any particular order of operation of the seals or importance of the seal. All seals are important with redundancy being provided in one embodiment at up to three levels and in another embodiment at up to two levels bi-directionally. In one embodiment, the secondary seals operate after leakage of the primary seal. However, the tertiary seal may operate before the secondary seal and/or with the secondary seal.

In the embodiment shown in FIG. 3, ball valve assembly 100 can provide for both selective upstream and/or downstream sealing to provide bi-directional sealing consistent with the teachings provided herein. This redundant sealing technology enables the ball valve to offer a longer service life than other ball valves taught by the associated prior art.

Accordingly, the seal rings may be provided in two configurations utilizing the same seats in both configurations. It is not necessary to change the seats. Most of the O-rings can be used in both configurations but in one embodiment one O-ring is changed. As well, most O-ring grooves are used in both configurations. In one simple non-limiting embodiment, the difference between the first configuration and the second configuration is an O-ring is removed from one groove and a different O-ring is placed in another groove without need to change the seats. In this way, in one configuration, the valve is bi-directional with primary and secondary seals. In another configuration only the primary seals are bi-directional. However in one direction secondary and tertiary seals are provided.

Accordingly, because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative of a presently preferred embodiment and not in a limiting sense.

The invention claimed is:

1. A ball valve, comprising:
a valve body;
a closure member mounted in said valve body, said closure member being round and rotatable between an open and a closed position to open and close a flowpath through said valve body;
a plurality of seat assemblies collectively mounted in said valve body defining a plurality of seal ring grooves;
said ball valve being selectively configurable in a first configuration or a second configuration;
said first configuration comprising a first group of sealing rings mounted in a first selection of said plurality of seal ring grooves within said plurality of seat assemblies to form two primary seals and two secondary seals, each of said two secondary seals being responsive to leakage from respective of said two primary seals for activation, each of said two primary seals and each of said two secondary seals being in contact with said closure member during operation at least prior to leakage; and
said second configuration comprising a second group of sealing rings mounted in a second selection of said plurality of seal ring grooves different from said first selection of said plurality of seal ring grooves within said plurality of seat assemblies to form said two primary seals, a secondary seal and a tertiary seal, wherein said secondary seal is responsive to activate in response to leakage from a primary seal, and said tertiary seal is responsive to activate in response to leakage from said secondary seal each of said two primary seals, said secondary seal and said tertiary seal being in contact with said closure member during operation at least prior to leakage.

2. The ball valve of claim 1, wherein in said second configuration a secondary seal mechanism is configured to receive leakage from said primary seal so that when said primary seal leaks then said secondary seal is automatically activated without manual intervention, and a tertiary seal mechanism that is configured so that when said secondary seal leaks then said tertiary seal is automatically activated without manual intervention.

3. The ball valve of claim 1, wherein said plurality of seat assemblies comprise:
a first inner seat assembly mounted in said valve body comprising a first inner seal member that engages a first side of said closure member;
a second inner seat assembly mounted in said valve body comprising a second inner seal member that engages a second side of said closure member;
a first outer seat assembly mounted in said valve body comprising a first outer seal element that engages a first side of said closure member;
a second outer seat assembly mounted in said valve body comprising a second outer seal element that engages a second side of said closure member;
said first group of sealing rings being mounted at an offset position from said closure member so that said first group of sealing rings do not contact said closure member; and
said second group of sealing rings being mounted at an offset position from said closure member so that said second group of sealing rings do not contact said closure member, at least one of said sealing rings in said second group of sealing rings being positioned in a different groove as compared to said first group of sealing rings.

4. The ball valve of claim 3, further comprising in said first configuration, said first inner seat assembly and said second inner seat assembly form said two primary seals and said first outer seat assembly and said second outer seat assembly form said two secondary seals without a tertiary seal, and
in said second configuration, said first inner seat assembly and said second inner seat assembly form said two primary seal and said first outer seat assembly forms said secondary seal and said second outer seat assembly forms said tertiary seal, said tertiary seal being configured to be activated by leakage from said secondary seal.

5. The ball valve of claim 3, further comprising said plurality of seal ring grooves being disposed in said first inner seat assembly, said second inner seat assembly, said first outer seat assembly, and said second outer seat assembly, in said first configuration at least one said seal ring groove is empty as compared to said second configuration.

6. The ball valve of claim 3, further comprising a peripheral seal ring groove formed on an outer periphery of at least one of said first inner seat assembly or said second inner seat assembly so that the absence of at least one sealing ring within said peripheral seal ring groove is consistent with said first configuration.

7. The ball valve of claim 3, further comprising a peripheral seal ring groove formed on an outer periphery of at least one of said first outer seat assembly or said second outer seat assembly so that absence of at least one sealing ring within said peripheral seal ring groove is consistent with said second configuration.

8. A method for making a ball valve, comprising:
providing a valve body;
providing a closure member mounted in said valve body, said closure member being round and rotatable between and open and a closed position to open and close a flowpath through said valve body;
providing a plurality of seat assemblies collectively mounted for use in both a first configuration and a second configuration of said ball valve;
providing that said first configuration comprises sealing rings mounted on said plurality of seat assemblies in a first selection of a plurality of seal ring grooves to form two primary seals and two secondary seals, each of said two secondary seals being responsive to leakage from a respective of said two primary seals for activation, each of said two primary seals and each of said two secondary seals being in contact with said closure member during operation prior to leakage;

providing that said second configuration comprises sealing rings mounted on said plurality of seat assemblies in a second selection of said plurality of seal ring grooves different from said first configuration to form said two primary seals, a secondary seal and a tertiary seal, and providing that said secondary seal is responsive to activate when one of said two primary seal leaks and said tertiary seal is responsive to activate when said secondary seal leaks each of said two primary seals, said secondary seal and said tertiary seal being in contact with said closure member during operation prior to leakage.

9. The method of claim 8, further comprising providing that a first inner seat assembly mounted in said valve body engages a first side of said closure member, a second inner seat assembly mounted in said valve body engages a second side of said closure member, a first outer seat assembly mounted in said valve body engages a first side of said closure member, and a second outer seat assembly mounted in said valve body engages a second side of said closure member.

10. The method of claim 9 further comprising providing that said first inner seat assembly is axially moveable with respect to an axis of said flowpath, said second inner seat assembly is axially moveable with respect to an axis of said flowpath, said first outer seat assembly is axially moveable with respect to an axis of said flowpath, and said second outer seat assembly is axially moveable with respect to an axis of said flowpath.

11. The method of claim 9 further comprising providing seal ring grooves in said first inner seat assembly, said second inner seat assembly, said first outer seat assembly, and said second outer seat assembly, wherein said seal rings are mountable in selectable of said seal ring grooves to selectively provide said first configuration and said second configuration.

12. The method of claim 9 further comprising providing a peripheral seal ring groove formed on an outer periphery of at least one of said first inner seat assembly or said second inner seat assembly so that presence of at least one seal ring within said peripheral seal ring groove is consistent with said second configuration.

13. The method of claim 8 further comprising providing that said tertiary seal is automatically activated when a valve cavity pressure is greater than a pressure in a valve outlet.

\* \* \* \* \*